(No Model.) 2 Sheets—Sheet 1.
C. M. CONRADSON.
FEEDING DEVICE FOR LATHES.
No. 477,513. Patented June 21, 1892.
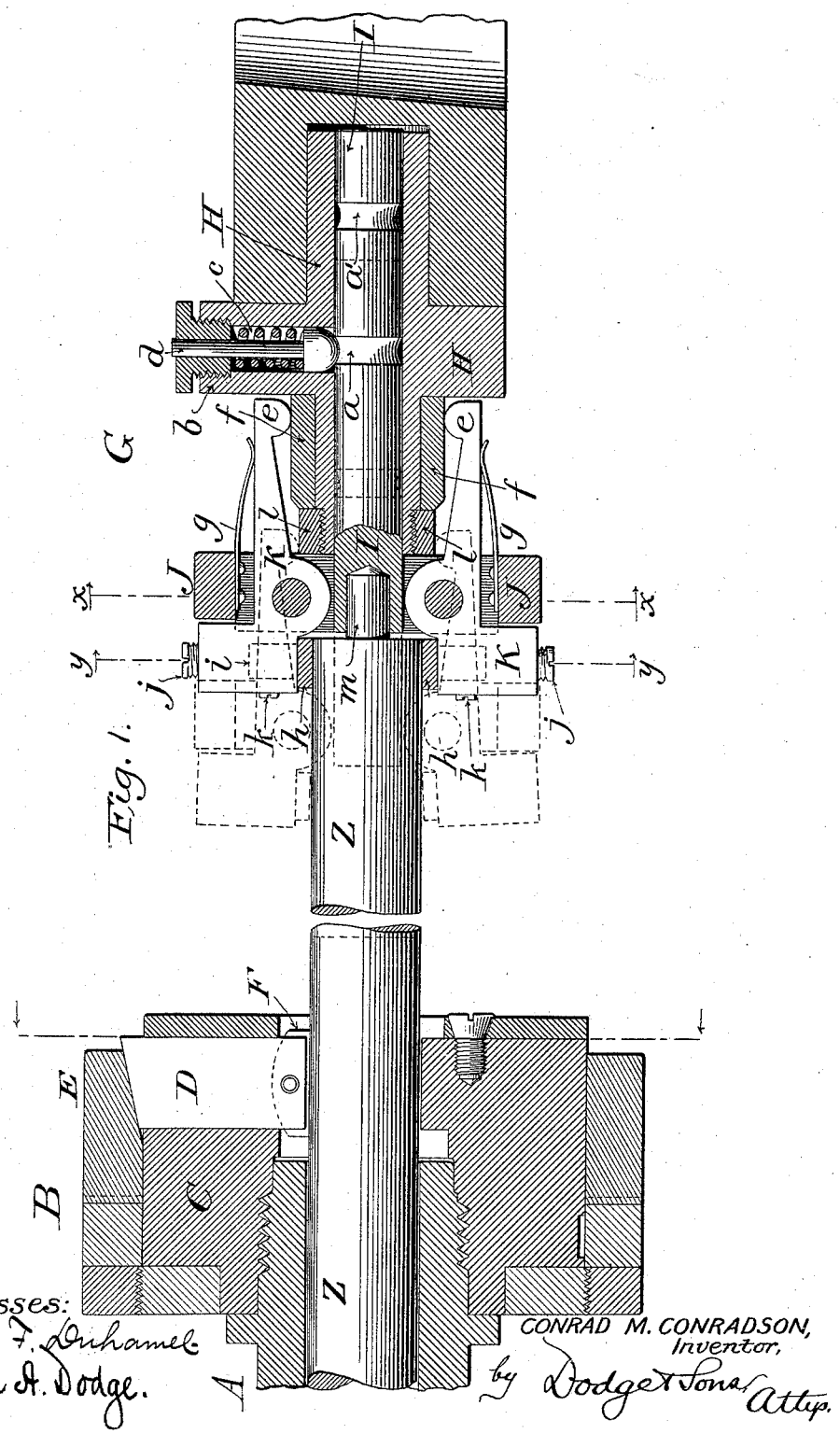
Witnesses:
James F. Duhamel.
Horace A. Dodge.
CONRAD M. CONRADSON,
Inventor,
by Dodge & Sons,
Attys.

(No Model.) 2 Sheets—Sheet 2.
C. M. CONRADSON.
FEEDING DEVICE FOR LATHES.
No. 477,513. Patented June 21, 1892.
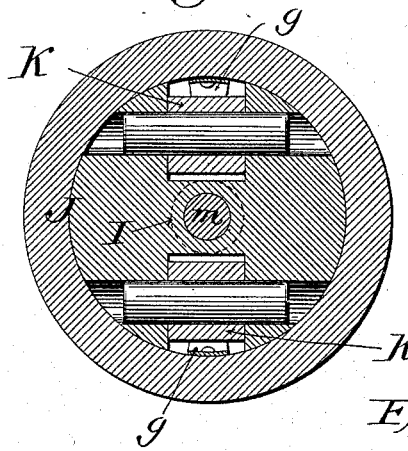
Fig. 2: on x-x.
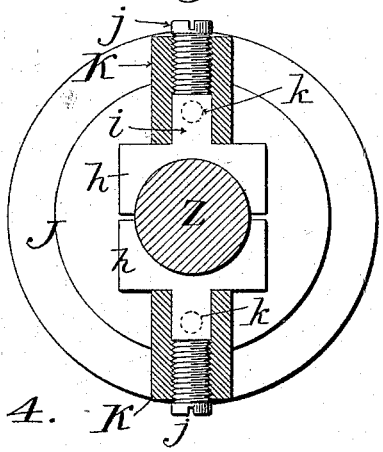
Fig. 3: on y-y.
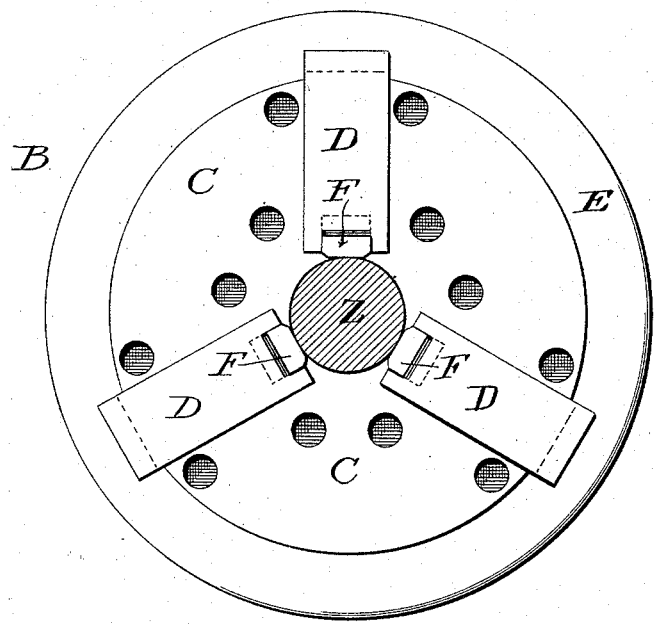
Fig. 4.
Witnesses:
James F. Duhamel
Horace A. Dodge.
CONRAD M. CONRADSON,
Inventor,
by Dodge & Sons,
Attys.
THE NORRIS PETERS CO., PHOTO-LITHO., WASHINGTON, D. C.

UNITED STATES PATENT OFFICE.

CONRAD M. CONRADSON, OF MADISON, WISCONSIN.

FEEDING DEVICE FOR LATHES.

SPECIFICATION forming part of Letters Patent No. 477,513, dated June 21, 1892.

Application filed January 29, 1892. Serial No. 419,674. (No model.)

*To all whom it may concern:*

Be it known that I, CONRAD M. CONRADSON, a citizen of the United States, residing at Madison, in the county of Dane and State of Wisconsin, have invented certain new and useful Improvements in Feeding Devices for Lathes, of which the following is a specification.

My invention relates to screw-machines, and has reference more particularly to a novel construction and arrangement of devices for feeding, centering, and holding the material operated upon.

In screw-machines as ordinarily made and used a rod is inserted through the hollow spindle of the machine, which is provided with gripping-jaws at the front end to accurately center the bar and support it while being operated upon. When a screw or other article has been finished, it is cut off and the chuck-jaws opened and another length is projected through the chuck. Where the length of the article made is short or small in relation to the diameter, this method produces good work; but if the piece is slender it springs away from the cutting-tools and the arrangement is unsatisfactory in every way. Another disadvantage is that if the bar operated upon is crooked the chuck-jaws in gripping it will throw the outer end away from or out of line with the center. It therefore becomes essential that only perfectly-straight bars be used, as otherwise they will not run true after being gripped with the chucks and in the manner referred to.

The present invention is designed to overcome these difficulties and to produce a machine that shall allow work of any length to be operated upon and shall also center both ends of the piece of material. One form of machine for securing these results is illustrated in the accompanying drawings, in which—

Figure 1 is a longitudinal vertical sectional view of a machine embodying my improvements; Fig. 2, a vertical transverse sectional view on the line $x\,x$ of Fig. 1; Fig. 3, a similar sectional view on the line $y\,y$ of Fig. 1, and Fig. 4 a front view of the spindle-chuck with the face-plate removed.

A indicates the hollow spindle or arbor of my machine, to the end of which is secured the chuck B. This chuck comprises a body portion C, a series of radially-moving jaws D, and a beveled actuating band or ring E, as shown in Figs. 1 and 4. These jaws D are each bifurcated at their lower ends, and between the ends or arms is pivoted a steel shoe F, which is designed to adapt or adjust itself to any irregularities in the surface or body of the bar Z to be clamped and operated upon. The inner end of the bar Z is centered in and clamped by a device G, which I denominate the "rod-feeding gripper," which in the present instance is shown applied to the turret of a lathe. This device comprises a flanged bushing H, screwed or otherwise secured to the turret (or any other suitable part of the machine) in line with the axis of the hollow spindle or arbor. Mounted within this bushing, so as to be capable of a rotary and also a longitudinal movement therein, is a spindle I, having at its outer end a head or enlargement J, and at its inner end one or more circumferential grooves $a\,a'$, as shown in Fig. 1. In the flange $b$ of the bushing is formed a socket $c$, in which is mounted a spring-pressed pin $d$, the inner rounded end of which is designed to enter either of the grooves $a\,a'$ in the spindle, the engagement being such that while the spindle is prevented from accidentally moving lengthwise it may be so moved by hand by exerting sufficient force to cause the rounded end of the pin to ride back into the socket and out of the groove.

The head or enlargement J of the spindle I is slotted to receive two gripping-levers K, which are pivoted therein at right angles to the axis of the spindle, as shown in Figs. 1, 2, and 3. These levers are each provided with a tail or extension $e$, designed to rest upon a collar or sleeve $f$, carried by the bushing H, as shown in Fig. 1, a spring $g$, secured to the head or enlargement J and bearing upon the tail of the lever, serving to hold the gripping-faces of the levers away from each other.

The outer ends of the levers K are each provided with a gripping-jaw $h$, having a semicircular seat to receive and bear upon the rod Z, and a stem $i$, which enters a socket formed in the end of the lever. These jaws $h$ are adjusted toward each other by means of screws $j$ and are held in their adjusted position by means of set-screws $k$, as shown in Figs. 1 and 3.

Surrounding the bushing H, in advance of the sleeve or collar $f$, is a second collar $l$, having a less diameter than that of collar $f$, the edge of the collar $f$ next to collar $l$ being beveled, as shown in Fig. 1, so as to allow the tails of the levers K, which, by the way, are rounded, to ride easily onto and off the collar $f$ as the spindle I and attached parts are moved lengthwise with relation to the bushing H.

The operation is as follows: The bar or rod Z is first passed through the hollow spindle or arbor A with the end projecting beyond the face of the chuck. The spindle I, with attached parts, should be now moved outward longitudinally with reference to its bushing, as indicated by the dotted lines in Fig. 1, whereupon the rounded tails or ends of the levers K will be found resting upon the small collar $l$, the pin $d$ engaging the groove $a'$ of the spindle and the jaws of the levers K being separated or opened. The gripping devices are now moved up toward the rod Z and the jaws $h$ pass upon the end of the bar until arrested by the bar coming into contact with the spindle I. Continuing the movement alluded to, the spindle will be pushed into the bushing and the tails of the levers riding up the inclined edge of collar $f$ will force the jaws $h$ firmly against the rod or bar Z, so as to clamp the latter. By the time that the levers K clamp the rod firmly the groove $a$ of the spindle will pass under the spring-pin $d$, which immediately locks the spindle and bushing against further independent longitudinal movement. When this has been accomplished, the gripping devices and the turret or other part to which they are secured are moved backward bodily, drawing with them the rod or bar Z. During these operations the bar remains unclamped within the chuck on the hollow arbor; but when a sufficient length of the rod has been fed through the arbor and chuck the jaws of the latter are so actuated as to cause them also to clamp the rod. Work may now be done upon the rod or bar Z while held at both ends, or, if desired, the turret may be moved backward still farther, so as to release the levers and jaws, and the rod operated upon while held only by the chuck-jaws. When work is done upon the bar or rod Z while held by the jaws $h$, the latter turn or rotate with the work, the spindle I, to which the levers K and attendant parts are attached, turning or rotating within the bushing H. The gripping devices may be applied to the end of the bar or rod Z while the latter is turning, if desired. I prefer to provide the spindle I with a central stud or projection $m$, against which the end of the bar Z shall strike when the gripping devices are brought up against the bar, instead of allowing the latter to bear directly against the spindle.

While I have shown the invention applied to a turret-lathe, I wish it understood that it may be applied to other styles of lathes, or to other parts of such lathes or machines. Neither do I wish to be understood to be limited to the precise construction herein shown, as the present invention comprises a gripper movable and acting, as described, regardless of its details.

Having thus described my invention, what I claim is—

1. In a lathe or machine having a hollow arbor through which the material is fed, the combination, with such hollow arbor, of a chuck applied thereto, and a rod-gripping device mounted upon a part of the lathe which is movable toward and from the face of the chuck, said rod-gripping devices being adapted to take hold of the rod and draw or feed it through the hollow arbor, substantially as shown and described.

2. In combination with the hollow arbor and its chuck, a combined rod-gripping and centering device substantially such as shown and described, movable toward and from the face of the chuck and adapted to take hold of the rod, draw it through the hollow arbor, and center it.

3. In combination with the hollow arbor and its chuck, a tool post or turret movable toward and from the face of the chuck, and rod-gripping devices mounted upon the tool post or turret to take hold of the rod and draw it through the hollow arbor and chuck.

4. In combination with the hollow arbor and its chuck, the rod-gripping device G, having the jaws K, said gripping device comprising two parts H and I, adapted to move lengthwise, one in relation to the other, and thereby actuate the gripper-jaws, all substantially as shown and described.

5. In combination with the hollow arbor and its chuck, the rod-gripping device G, having the jaws K, said gripping device comprising two parts H and I, one of which is adapted to move lengthwise and to rotate relatively to the other, all substantially as shown and described.

6. In combination with a turret, a bushing H, mounted therein and provided with an inclined face or collar $f$, and spindle I, provided with head J and gripping-levers K and moving longitudinally within the bushing, all substantially as shown and described.

7. In combination with bushing H, having pin $d$ and collars $f\,l$, spindle I, provided with grooves $a\,a'$, and pivoted gripping-levers K.

8. In combination with the hollow arbor and its chuck, a tool post or turret movable toward and from the face of the chuck, a rod-gripping mechanism carried by the said tool post or turret and provided with gripping-jaws which are automatically thrown into and out of action by the longitudinal movement of said jaws relatively to the tool post or turret.

In witness whereof I hereunto set my hand in the presence of two witnesses.

CONRAD M. CONRADSON.

Witnesses:
   W. R. BAGLEY,
   C. H. ALLYN.